United States Patent [19]

Mathis et al.

[11] 4,069,277

[45] Jan. 17, 1978

[54] DYEABLE POLYAMIDES CONTAINING AN ANTISTATIC AGENT

[75] Inventors: Ronald D. Mathis; James S. Dix, both of Greenville, S.C.

[73] Assignee: Phillips Fibers Corporation, Greenville, S.C.

[21] Appl. No.: 663,005

[22] Filed: Mar. 2, 1976

[51] Int. Cl.$^2$ ............................................. C08L 77/00
[52] U.S. Cl. ...................... 260/857 PE; 260/457 PS; 260/783; 260/857 PE
[58] Field of Search ................................ 260/857 PG

[56] References Cited

U.S. PATENT DOCUMENTS

| 3,293,208 | 12/1966 | Mathis ............................ 260/45.75 |
| 3,787,523 | 1/1974 | Crescentini ..................... 260/857 PG |
| 3,859,380 | 1/1973 | Crescentini ..................... 260/857 PG |
| 3,873,639 | 3/1975 | Crescentini ..................... 260/857 PG |
| 3,876,725 | 4/1975 | Wells ............................... 260/857 PG |
| 3,887,644 | 6/1975 | Wells ............................... 260/857 PG |
| 3,923,924 | 12/1975 | Wells ............................... 260/857 PG |

*Primary Examiner*—Paul Lieberman

[57] ABSTRACT

In polyamide compositions containing the reaction product of (1) a block copolymer of propylene oxide, ethylene oxide and an alkylene diamine and (2) a dicarboxylic acid ester in an amount sufficient to provide improved antistatic characteristics to the polyamide, the apparent dyeability can be increased by including in said polyamide composition a sufficient amount of at least one zinc dihydrocarbyl dithiophosphinate.

23 Claims, No Drawings

DYEABLE POLYAMIDES CONTAINING AN ANTISTATIC AGENT

This invention relates to polyamide compositions. In another aspect, this invention relates to polyamide compositions containing an antistatic agent. In a further aspect this invention relates to an additive that can be employed to increase the apparent dyeability of polyamide compositions containing certain antistatic agents.

Among the antistatic agents disclosed in French Patent 2,151,035 to BASF Wyandotte Corporation are those obtained when the product resulting from the condensation of ethylene oxide, propylene oxide and an alkylene diamine, such as ethylene diamine is reacted further with a dicarboxylic acid ester.

It has been discovered that when polyamides containing such antistatic agents are dyed they appear to have received less dye than polyamides not containing such antistatic agents even though the amount of dye contained may be the same. Stated differently, it has been observed that when such antistatic agents are employed the depth of the color obtained upon dyeing is less than that obtained for polyamides not containing such antistatic agents.

Accordingly, an object of this invention is to improve the apparent depth of color that can be obtained when dyeing polyamide compositions containing such antistatic agents.

Other objects and advantages of this invention will be apparent to those skilled in the art upon reading this disclosure.

According to this invention, it is contemplated that the apparent dyeability of a polyamide composition containing an antistatic agent of the type above mentioned can be improved by employing a sufficient amount of at least one zinc dihydrocarbyl dithiophosphinate compound. The zinc additive is particularly beneficial for improving the apparent dyeability when such polyamide compositions are dyed with acid dyes. A similar effect is envisioned for any dye that is generally used in the dyeing of polyamides.

The polyamides with which this invention is concerned are well known in the art as being characterized by the presence of recurring carbonamide groups—CONH as an integral part of the polymer chain and wherein such groups are separated by at least two carbon atoms. Normally, these polymers are prepared by the polymerization of lactams or by the polycondensation of aminocarboxylic acids or of diamines and dicarboxylic acids. Exemplary polymers include polycaprolactam, poly(aminodecanoic acid), poly(pyrrolidone), poly(hexamethylene adipamide), poly(hexamethylene sebacamide), and poly(hexamethylene terephthalamide), and the like. This invention relates particularly to normally solid fiber-forming polyamides but includes nonfiber-forming polyamides as well as liquid polyamides. This invention can also be applied to blends of polyamides as well as to copolyamides. In general, this invention is directed to any polyamide compositions which have their apparent dyeability adversely affected by the type of antistatic agent described above.

When the polyamides are to be employed for forming fibers, the polymerization is usually continued until the material has polymerized to a fiber-formable stage. The polymers thus obtained have high melting points and can be cold drawn to form strong highly oriented fibers. The diamines, dicarboxylic acids, and amide-forming derivatives thereof which can be used as reactants to yield the fiber-forming polyamides are well known in the art. Suitable diamines include, for example, those represented by the general formula:

$$NH_2 - R - NH_2$$

in which R is a divalent hydrocarbon radical having from 2 to 20 carbon atoms. Representative examples are ethylene diamine, propylene diamine, tetramethylene diamine, pentamethylene diamine, hexamethylene diamine, octamethylene diamine, and decamethylene diamine. Well known dicarboxylic acid reactants include those represented by the general formula:

$$HOOCRCOOH$$

in which R is as defined above. These dicarboxylic acids may be illustrated by sebacic acid, octadecanedioic acid, adipic acid, suberic acid, azelaic acid, undecanedioic acid, glutaric acid, pimelic acid, brassylic acid, tetradecanedioic acid, terephthalic acid, eicosanedioic acid, and isophthalic acid.

In place of the above-noted dicarboxylic acids and diamines those skilled in the art recognize that the amide-forming derivatives thereof can be employed to form fiber-forming polymers. Amide-forming derivatives of the diamines include the carbamates and N-formyl derivative. Amide-forming derivatives of the dibasic carboxylic acids comprise the mono- and diester, the anhydride, and mono- and diamide, and the acid halide.

In addition to the above diamines and dicarboxylic acids and their derivatives, it is also known in the art that the polyamides may be prepared from certain of the amino acids. The amino acids are represented by the general formula:

$$H_2N - R - COOH$$

in which R is as defined above. Illustrative examples of these amino acids are 6-aminocaproic acid, 7-aminoheptanoic acid, 8-aminooctanoic acid, 9-aminononanoic acid, 10-aminodecanoic acid, 11-aminoundecanoic acid, 12-aminododecanoic acid, 13-aminotridecanoic acid, and 20-aminoeicosanoic acid. Also the lactams of these amino acids may be used as monomers from which the polyamides of the present invention may be prepared. These types of polyamides are included in the scope of the polyamides with which this invention is concerned.

In addition to the homopolyamides, copolyamides and terpolyamides are also contemplated and are within the scope of this invention. It is known in the art that copolyamides and terpolyamides can be obtained employing mixtures of diamines and dibasic acids, with the total diamines being present in substantially equimolar proportions to the total dibasic acids present during the polymer-forming reaction. Co- and terpolymeric products may be formed directly from the corresponding monomers, or one or more homopolymers may be added to the polymerizable reactants, distribution of the desired units entering the products via amide interchange. Formation of the desired diamine salts of the various dibasic acids prior to melt polymerization assists in control of the reaction. The conventional polyamide melt polymerization cycle is suitable.

As stated above, this invention is related to polyamide compositions containing as an antistatic agent a product resulting when the condensation product of ethylene oxide, propylene oxide, and ethylene diamine is reacted further with at least one dicarboxylic acid ester.

The block copolymers of propylene oxide, ethylene oxide, and alkylene diamine that are employed in preparing the antistatic agent with which this invention is concerned comprise at least one compound represented by the general formula:

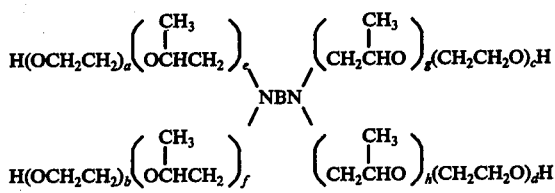

where $a$, $b$, $c$, $d$, $e$, $f$, $g$, and $h$ are each a whole number and the total of $a$, $b$, $c$, and $d$ is between 8 and 1,000 and the total of $e$, $f$, $g$, and $h$ is between 8 and 850 and B is an alkylene radical containing 1 to 13 carbon atoms. The term "whole number" as used herein refers to zero or any positive integer. The block polymers shown in the formula are often referred to as tetrol compounds. That terminology will be used in this application. Suitable tetrol compounds are commercially available (BASF Wyandotte) under the trademark Tetronic as a series of the poly(oxyethylene)-poly(oxypropylene) block copolymers having molecular weights ranging from about 1650 to about 135,000. The chain lengths of the poly(oxyethylene) and the poly(Oxypropylene) moieties vary in this series. For use as an antistatic agent in polyamide generally the ethylene oxide moieties make up from about 10 to about 90 weight percent of the tetrol compound.

In the context of the instant invention, the molecular weights of the preferred tetrol compounds range from about 4,000 to about 50,000 and the ethylene oxide moiety contents preferably range from about 20 to about 80 weight percent of the compounds.

The preparation of some of the tetrol compounds employed in preparing the antistatic agents is shown in U.S. Pat. No. 2,979,528. The disclosure of the patent is incorporated herein by reference.

As pointed out in the above-mentioned French patent, the tetrol compounds are prepared under standard oxyalkylation conditions, for example at pressures in the range of 2.39 to 6.33 kg/cm², a temperature in the range of 100° to 175° C., in the presence of a conventional oxyalkylation catalyst.

The dicarboxylic acid esters reacted with the tetrol compounds to prepare the antistatic agent with which this invention is concerned can be represented by the general formula

where A is a valence bond or a divalent hydrocarbyl radical having 1 to 8 carbon atoms and each R′ is an alkyl group containing 1 to 4 carbon atoms or a hydroxyalkyl group containing 2 to 4 carbon atoms. The R′ radicals can be the same or different.

Acyclic aliphatic dicarboxylic acid esters that would be suitable for the preparation of the antistatic agent would include, for example, dimethyl oxalate, diethyl malonate, methyl propyl succinate, dimethyl adipate, (2-hydroxyethyl) methyl pimelate, bis(2-hydroxypropyl) suberate, bis(2-hydroxy-n-butyl) sebacate and mixtures of any two or more.

Cycloaliphatic dicarboxylic acid esters which can be used in the preparation of the antistatic agents would include, for example, dimethyl cyclopropanedicarboxylate, bis(2-hydroxypropyl) 1,4-cyclohexanedicarboxylate, and mixtures of any two or more thereof.

Typical aromatic dicarboxylic acid esters that can be employed in preparing the antistatic agent include, for example, diethyl phthalate, methyl ethyl isophthalate, dimethyl terephthalate, and the like and mixtures of any two or more thereof.

The antistatic agent is prepared by reacting the dicarboxylic acid ester with the tetrol compound in a respective molar ratio in the range of betwen 0.5/1.0 and 1.0/1.0, and preferably between 0.7/1.0 and 0.95/1.0, commonly in an inert atmosphere, at a temperature between about 60 and about 160° C., at either atmospheric or reduced atmospheric pressure, for a period of time between 1 and 4 hours. The reaction is preferably carried out at a reduced pressure at a temperature in the range of 70° to 150° C. for a period of time in the range of 1 to 2 hours.

In preparing the antistatic agent a catalyst may be employed. Suitable catalysts are transesterification catalysts, such as, for example, sodium hydroxide, potassium hydroxide, etc. The catalyst is used, of course, in catalytic quantities, ranging between 0.01 and 0.2 part per 100 parts by weight of reactants. When a transesterification catalyst is used, it is necessary to neutralize any residual quantity of catalyst by conventional methods after completion of the reaction. The product of this reaction ranges from a viscous liquid to a hard wax. The hard wax, when heated or subjected to elevated temperatures, is converted into a highly viscous liquid, which, by way of illustration, will have a viscosity at 100° C. of between 200 and 40,000 centipoises, the same viscosity range applying in the case when liquid products are obtained.

The zinc dithiophosphinate compounds employed in this invention are zinc dihydrocarbyl dithiophosphinates in which the hydrocarbyl group is selected from acyclic alkyl radicals containing from 4 to 10 carbon atoms and cycloaliphatic radicals containing from 4 to 10 carbon atoms, for example, zinc dibutyldithiophosphinate, zinc dihexyldithiophosphinate, zinc didecyldithiophosphinate, zinc butyl-heptyldithiophosphinate, zinc dicyclobutyldithiophosphinate, zinc dicyclopentyldithiophosphinate, zinc dicycloheptyldithiophosphinate, zinc dicyclooctyldithiophosphinate, zinc dicyclodecyldithiophosphinate, and the like and mixtures of any two or more thereof. A particularly preferred zinc compound is zinc dicyclohexyldithiophosphinate. This compound can be prepared as described in Example I of U.S. Pat. No. 3,293,208.

The zinc stabilizer compound is used in the compositions of this invention in an amount such that when the polyamide composition is dyed the K/S value is greater than that which would be observed if no zinc dihydrocarbyldithiophosphinate were present. Generally, the zinc stabilizer is employed in amounts ranging from about 0.02 to about 2.5 weight percent, more preferably from about 0.05 to about 1.5 weight percent, based on the weight of the polyamide plus the antistatic agent.

Antioxidants of the hindered phenol type selected from the group consisting of 2,6-di-t-butyl-4-methylphenol, octadecyl[3-(3,5-di-t-butyl-4-hydroxyphenyl)] propionate, di-n-octadecyl(3,5-di-t-butyl-4-hydroxybenzyl) phosphonate, tetrakis[methylene(3,5-di-t-butyl-4-hydroxyhydrocinnamate)] methane, 1,3,5-trimethyl-2,4,6-tris(3,5-di-t-butyl-4-hydroxybenzyl)benzene and tris(3,5-di-t-butyl-4hydroxybenzyl)isocyanurate can also be present in the compositions. When used, the antioxidant is employed in an amount effective for protecting the polymer against oxidation. Generally, the amount of antioxidant can range from about 0.02 to about 2 weight percent, more preferably from about 0.05 to about 0.5 weight percent based on the weight of polyamide plus antistatic agent.

Preferably, the zinc dithiophosphinate is added to a melt of the antistatic agent and the resulting composition is then added to the polyamide. However, the zinc compound and the antistatic agent can be added to the materials which are reacted to form the polyamide; or the zinc compound can be blended into molten polyamide before or after the blending in of the antistatic agent.

The polyamide compositions of this invention may be modified by the addition of any other materials known in the art, for example, dyes, plasticizers, resins, waxes, fillers, pigments, delusterants, nucleating agents, and the like. Of course, it is not advisable to employ additives which have an antagonistic effect on the properties that the instant inventive composition is intended to provide.

The improved polyamide compositions of this invention can be converted into any of the forms suitable for polyamides generally, such as fibers, yarns, tire cord, bristles, fabric, molded articles, films, and coatings for filaments, textiles, wood, leather, ceramics, and the like.

The polyamide compositions of this invention when subjected to dyeing will yield compositions that appear to have greater depth of color than similar compositions which do not contain the described zinc dithiophosphinate additive.

The following examples will provide further illustration of this invention and demonstrate its effect.

EXAMPLE I

Preparation of Antistatic Agent

A typical antistatic agent used in this invention is prepared by placing in a suitable vessel 2120 grams of a normally solid tetrol compound having a molecular weight of about 20,000 and containing about 60 weight percent ethylene oxide moiety content with 2.1 grams of 90 percent pure potassium hydroxide dissolved in about 15 ml of methanol. The mixture is then heated with stirring at about 150° C. at a pressure of 2 mm Hg for ½ hour. The vacuum is replaced with a nitrogen atmosphere and 14.3 grams of dimethyl terephthalate is added (corresponds to about 0.7 mole diester per mole of tetrol compound). This mixture is heated to 145° C. with stirring and the pressure is reduced to 2 mm Hg for 1 hour, after which essentially all of the methanol has been distilled from the mixture. The remaining potassium hydroxide is then neutralized with 1.5 ml of 85 percent orthophosphoric acid, the water is removed at about 115° C. and the product is recovered. It consists of a normally solid, waxy material melting at about 50° C. and has a viscosity of 17,000 centipoises at 100° C. This material is called TDMT, for convenience.

EXAMPLE II

A series of polyamide compositions containing the antistatic agent TDMT prepared in the preceding example were formulated and dyed. A comparison of the characteristics of the dyed polyamide compositions is shown in the following tables.

Each polyamide composition shown in the following tables was prepared so that the amount of antistatic agent present would be equal to 4 weight percent of the weight of the polyamide plus the weight of the antistatic agent.

The polyamide compositions were prepared by melting the necessary quantity of antistatic agent and then stirring into the melted antistatic agent any other additives employed to yield a viscous mass. Each resulting melt was then cooled to give a slab of solid, waxy material which was subsequently cut into small pieces and separately dried at room temperature for 15 to 20 hours under vacuum. Fiber grade poly(hexamethylene adipamide) in chip form was dried for 20 hours at 100°–120° C. under vacuum. Each dried antistatic mixture and the polymer chip were kept sealed in a dry atmosphere until just prior to pelletization, at which time they were tumbled together to obtain a uniform mixture of the components. Each mixture of the components was then pelletized by introducing it into a one inch extruder equipped with a 24:1 L/D screw at a melt temperature at the die entrance of 525° F. (274° C.) and a one minute residence time. A nitrogen blanket was used at the feed hopper. The resulting pelleted samples were dried for 20 hours at 100°–120° C. under vacuum and spun in an experimental size piston extruder (5/8 inch diameter barrel) having a capacity of 20 grams through an attached 6 hole spinnerette die in which each orifice had a length-/diameter ratio in mils of 12:9. Polymer throughput was 1 cc/minutes and the melt temperature was 560° F. (293° C.). The resulting fiber was 2 plied and drawn 3 to 1 (3X) at 330° F. (166° C.) to obtain a 6 denier per filament yarn consisting of 12 fibers having a total denier of 72. Knitted samples were prepared on a Lawson-Hemphill fiber analysis knitter using a 380 needle head and operated at a 3.5 meter head setting. Each knit was prescoured at 160° F. (71° C.) for 15 minutes, rinsed and then dyed with an acid dye for 1 hour at the boil at the percent dye level based on the weight of the fiber (shown in Tables), rinsed and tumble dried. The following dyes were used: Merpacyl Blue 2 GA (C.I, Acid Blue 40), Merpacyl Blue SW (C.I. Acid Blue 40), and Lanasyn Brilliant Red RL (C.I. Acid Red 263). The first two dyes are DuPont products and the second dye is a Ciba product. Depth of dyeing was determined by measuring the K/S values on a Diano/SSCE color eye (standard illuminant C) equipped with a Diano/LSCE auto mate system. The depth of color is approximately proportional to the K/S value, which is a measure of the light reflected from the dyed sample. The larger the K/S value, the deeper the shade, and a K/S value of 20 indicates that the shade is approximately twice as deep as the shade represented by a K/S value of 10. The determination of K/S values is set forth in an article by D. B. Judd, "Color in Business", Science and Industry, 1952, pages 314–342.

Dye lightfastness (gray scale rating) was evaluated in a Xenon fadeometer according to AATCC method 16E. In this method, lightfastness is evaluated in terms of a color-change comparison with a standard. A rating of 5 indicates no change and a rating of 1 indicates considerable change. The ratings are determined visually by a panel of 3 observers and the average for each sample is recorded. The results are presented in the following Tables.

In the Tables, ZDDP denotes zinc dicyclohexyldithiophosphinate and AO denotes tetrakis[methylene(3,5-di-t-butyl-4-hydroxyhydrocinnamate)] methane.

In the tables, a heading will be noted entitled Batch No. Not all the samples listed in the tables were dyed and exposed at the same time. Only those samples having identical batch numbers were dyed and exposed at the same time, thus meaningful comparisons can only be obtained by comparing those samples having identical Batch Nos.

exposure. For example, in Table I samples 7-11 all have the same lightfastness value after 20 hours of exposure but as exposure time is increased the compositions containing ZDDP have higher lightfastness values.

Further, the data in the tables indicate that tetrakis [3,5-di-t-butyl-4-hydroxyhydrocinnamate)]methane further enhances the effect provided by ZDDP.

EXAMPLE III

Using the same technique used in Example II polyamide compositions containing TDMT were prepared in which cobalt dicyclohexyldithiophosphinate (CDDP) was employed rather than zinc dicyclohexyldithiophosphinate. The compositions were dyed with 1.5 percent based on fiber weight of Merpacyl Blue 2GA or 2.5 percent based on fiber weight of Lanasyn Brilliant Red RL. The following table summarizes the ingredients of each composition and demonstrate the effect of those ingredients upon the color yield and dye lightfastness.

Table I

Color Yield and Dye Lightfastness of Antistatic Polyamide Fiber Containing ZDDP and Dyed with Merpacyl Blue 2GA[1]

| Sample No. | Additives, Wt.[2] % ZDDP | AO | Batch No. | K/S 620 mμ* | Dye Lightfastness 20 Hr. | 40 Hr. | 60 Hr. |
|---|---|---|---|---|---|---|---|
| 1 | 0 | 0 | 1 | 7.8 | 3-4 | 3 | 2-3 |
| 2 | 0.5 | 0.1 | 1 | 8.8 | 4 | 3-4 | 3-4 |
| 3 | 0 | 0 | 2 | 7.6 | 3-4 | 3 | 2-3 |
| 4 | 0.5 | 0.1 | 2 | 8.4 | 4-5 | 4-5 | 4 |
| 5 | 0 | 0 | 3 | 6.1 | 3-4 | 3 | 2-3 |
| 6 | 0.5 | 0.1 | 3 | 7.3 | 4-5 | 4-5 | 4 |
| 7 | 0 | 0 | 4 | 7.3 | 4-5 | 2-3 | 2-3 |
| 8 | 0.1 | 0.1 | 4 | 7.7 | 4-5 | 4 | 3 |
| 9 | 0.3 | 0 | 4 | 7.8 | 4-5 | 3-4 | 3-4 |
| 10 | 0.3 | 0.1 | 4 | 7.9 | 4-5 | 4-5 | 4-5 |
| 11 | 0.5 | 0 | 4 | 7.9 | 4-5 | 4 | 4 |
| 12 | 0 | 0 | 5 | 7.4 | 4 | 3 | 2-3 |
| 13 | 0 | 0.1 | 5 | 7.0 | 4 | 2-3 | 2 |
| 14 | 0.3 | 0 | 5 | 7.2 | 4-5 | 3 | 3 |
| 15 | 0.3 | 0.1 | 5 | 7.9 | 4 | 3-4 | 3 |
| 16 | 0.5 | 0 | 5 | 7.6 | 4 | 3-4 | 3 |
| 17 | 0.5 | 0.1 | 5 | 8.1 | 4 | 3 | 2-3 |

[1]1.5 weight percent based on weight of fiber.
[2]Weight percent based on polymer plus antistatic agent.
*620 mμ is equivalent to 6200 nm.

Table II

Color Yield and Dye Lightfastness of Antistatic Polyamide Fiber Containing ZDPP and Dyed with Lanasyn Brilliant Red RL[1]

| Sample No. | Additives, Wt.[2] % AS | ZDDP | AO | Batch No. | K/S 520 mμ* | Dye Lightfastness 20 Hr. | 40 Hr. | 60 Hr. |
|---|---|---|---|---|---|---|---|---|
| 1 | TDMT | 0 | 0 | 1 | 13.6 | 4-5 | 4 | 3-4 |
| 2 | TDMT | 0.5 | 0.1 | 1 | 15.6 | 4-5 | 4-5 | 4-5 |
| 3 | TDMT | 0 | 0 | 2 | 14.2 | 5 | 4-5 | 4 |
| 4 | TDMT | 0.5 | 0.1 | 2 | 15.7 | 5 | 5 | 4-5 |
| 5 | TDMT | 0 | 0 | 5 | 11.7 | 4-5 | 3-4 | 3 |
| 6 | TDMT | 0 | 0.1 | 5 | 11.1 | 5 | 4 | 3 |
| 7 | TDMT | 0.3 | 0 | 5 | 11.8 | 5 | 4-5 | 4 |
| 8 | TDMT | 0.3 | 0.1 | 5 | 12.4 | 4-5 | 5 | 4 |
| 9 | TDMT | 0.5 | 0 | 5 | 12.9 | 4-5 | 4 | 3-4 |
| 10 | TDMT | 0.5 | 0.1 | 5 | 12.7 | 5 | 4-5 | 4 |

[1]2.5 weight percent based on weight of fiber.
[2]Weight percent based on polymer plus antistatic agent.
*520 mμ is equivalent to 5200 nm.

Table III

Color Yield and Dye Lightfastness of Antistatic Nylon Fiber Containing ZDDP and Dyed with Merpacyl Blue SW[1]

| Sample No. | Additive, Wt.[2] % ZDDP | AO | Batch No. | K/S 620 mμ* | Dye Lightfastness 20 Hr. | 40 Hr. | 60 Hr. |
|---|---|---|---|---|---|---|---|
| 1 | 0 | 0 | 1 | 11.8 | 3-4 | 3 | 2-3 |
| 2 | 0.5 | 0.1 | 1 | 13.6 | 5 | 5 | 4-5 |
| 3 | 0 | 0 | 2 | 12.5 | 4 | 3-4 | 3 |
| 4 | 0.5 | 0.1 | 2 | 14.1 | 5 | 4-5 | 4-5 |

[1]1.5 weight percent based on weight of fiber.
[2]Weight percent based on polymer plus antistatic agent.
*620 mμ is equivalent to 6200 nm.

The data in Tables I-III show that when such antistatic polyamide formulations are dyed with acid dyes, zinc dicyclohexyldithiophosphinate generally has the capability of increasing the apparent depth of dyeing (K/S values are larger), and of increasing the dye lightfastness of the dyed samples.

In comparing lightfastness, it should be noted that a value of 5 is optimum. To get a comparison of the lightfastness of the various compositions it is necessary to compare how the various compositions are affected by

Table IV

Color Yield and Dye Lightfastness of Antistatic Polyamide Containing Cobalt Dicyclohexyldithiophosphinate

| Sample | Additive, wt.[1] % | | | Batch | K/S | Dye Lightfastness | | |
|---|---|---|---|---|---|---|---|---|
| No. | CDDP | AO | Dye | No. | 620 m* | 20 Hr. | 40 Hr. | 60 Hr. |
| 1 | 0 | 0 | Blue[2] | 1 | 8.8 | 4 | 3 | 3 |
| 2 | 0.3 | 0.1 | Blue[2] | 1 | 8.5 | 2 | 1 | 1 |
| 3 | 0 | 0 | Red[3] | 1 | 15.0 | 4–5 | 4 | 3 |
| 4 | 0.3 | 0.1 | Red[3] | 1 | 15.1 | 4 | 3–4 | 3 |

[1]Weight percent based on polymer plus antistatic agent.
[2]1.5 percent based on fiber weight.
[3]2.5 percent based on fiber weight.
*620 mμ is equivalent to 6200 nm.

The data in Table IV shows that cobalt dicyclohexyldithiophosphinate does not provide any significant improvement in the K/S value or dye lightfastness of polyamide compositions rendered antistatic with TDMT. This is in striking contrast to the effect provided by zinc dicyclohexyldithiophosphinate as shown in Tables I–III.

The foregoing examples have been provided merely to illustrate the instant invention and are not intended to limit the scope of the invention as described herein.

What is claimed is:

1. A polyamide composition comprising (A) a polyamide, (B) an antistatic agent comprising the reaction product of (1) at least one tetrol compound of the formula:

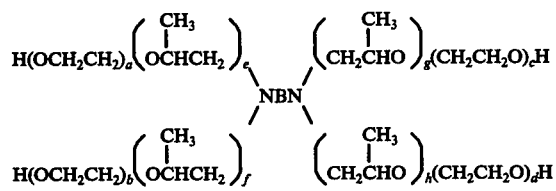

where $a$, $b$, $c$, $d$, $e$, $f$, $g$, and $h$ are each a whole number and the total of $a$, $b$, $c$, and $d$ is between 8 and 1,000 and the total of $e$, $f$, $g$, and $h$ is between 8 and 850 and B is an alkylene radical containing 1 to 13 carbon atoms, wherein the molecular weight of said tetrol compound is between about 1,650 and about 135,000 and said (OCH$_2$CH$_2$) moieties make up from about 10 to about 90 weight percent of said tetrol compound, and (2) at least one dicarboxylic acid ester having the formula R'OOC–A–COOR' wherein A is a valence bond or a divalent hydrocarbyl radical having from 1 to 8 carbon atoms and R' is an alkyl group containing 1 to 4 carbon atoms or a hydroxyalkyl group containing 2 to 4 carbon atoms, wherein the two R' radicals may be the same or different; and (C) a zinc dihydrocarbyldithiophosphinate in which the hydrocarbyl group is selected from acyclic alkyl radicals containing 4 to 10 carbon atoms and cycloaliphatic radicals containing from 4 to 10 carbon atoms; said zinc dihydrocarbyldithiophosphinate being present in said polyamide composition in such an amount that when said polyamide composition is dyed the K/S value is greater than that which would be observed if no zinc dihydrocarbyldithiophosphinate were present, and said antistatic agent being present in an amount sufficient to improve the antistatic characteristics of said polyamide.

2. A composition according to claim 1 wherein said zinc dihydrocarbyldithiophosphinate is zinc dicyclohexyldithiophosphinate.

3. A composition according to claim 1 wherein the amount of said antistatic agent is in the range of from about 1 to about 12 weight percent, based on the weight of the polyamide; and the amount of said zinc dihydrocarbyldithiophosphinate is in the range of from about 0.02 to about 2.5 weight percent, based on the weight of polyamide plus antistatic agent.

4. A composition according to claim 3 wherein said zinc dihydrocarbyldithiophosphinate is zinc dicyclohexyldithiophosphinate.

5. A composition according to claim 1 wherein the antistatic agent is one which can be prepared by reacting dimethyl terephthalate with a tetrol compound having an ethylene oxide moiety content of about 60 weight percent and a molecular weight of about 20,000.

6. A composition according to claim 5 wherein said polyamide is poly(hexamethylene adipamide).

7. A composition according to claim 6 which has been dyed with an acid dye selected from Merpacyl Blue 2GA, Merpacyl Blue SW, and Lanasyn Brilliant Red RL.

8. A composition according to claim 7 which has been spun into filaments prior to being dyed.

9. A composition according to claim 6 wherein said polyamide composition also contains tetrakis[methylene(3,5-di-t-butyl-4-hydroxyhydrocinnamate)] methane in an amount in the range of from about 0.02 to about 2 weight percent based on the weight of polyamide plus antistatic agent.

10. A composition according to claim 11 wherein said polyamide composition also contains tetrakis[methylene(3,5-di-t-butyl-4-hydroxyhydrocinnamate)] methane in an amount in the range of from about 0.02 to about 2 weight percent based on the weight of polyamide plus antistatic agent.

11. A polyamide composition comprising (A) a polyamide, (B) an antistatic agent comprising the reaction product of (1) at least one tetrol compound of the formula:

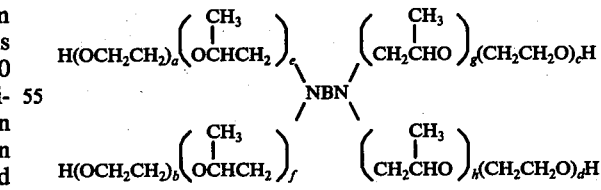

where $a$, $b$, $c$, $d$, $e$, $f$, $g$, and $h$ are each a whole number and the total of $a$, $b$, $c$, and $d$ is between 8 and 1,000 and the total of $e$, $f$, $g$, and $h$ is between 8 and 850 and B is an alkylene radical containing 1 to 13 carbon atoms, wherein the molecular weight of said tetrol compound is between about 1,650 and about 135,000 and said (OCH$_2$CH$_2$) moieties make up from about 10 to about 90 weight percent of said tetrol compound, and (2) at least one dicarboxylic acid ester having the formula R'OOC—A—COOR' wherein A is a valence bond or a divalent hydrocarbyl radical having from 1 to 8 carbon atoms and R' is an alkyl group containing 1 to 4 carbon atoms or a hydroxyalkyl group containing 2 to 4 carbon atoms, wherein the two R' radicals may be the same or different; and (C) zinc dicyclohexyldithiophosphinate; wherein the amount of said antistatic agent is in the range of about 1 to about 12 weight percent, based on the weight of the polyamide, and the amount of zinc dicyclohexyldithiophosphinate is in the range of about 0.02 to about 2.5 weight percent, based on the weight of polyamide plus antistatic agent.

12. A polyamide composition prepared by admixing (A) a polyamide, (B) an antistatic agent comprising the reaction product of (1) at least one tetrol compound of the formula:

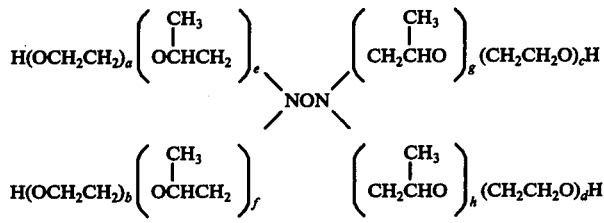

where $a, b, c, d, e, f, g,$ and $h$ are each a whole number and the total of $a, b, c,$ and $d$ is between 8 and 1,000 and the total of $e, f, g,$ and $h$ is between 8 and 850, Q is an alkylene radical containing 1 to 13 carbon atoms, wherein the molecular weight of said tetrol compound is between about 1,650 and about 135,000 and said (OCH$_2$CH$_2$) moieties make up from about 10 to about 90 weight percent of said tetrol compound, and (2) at least one dicarboxylic acid ester having the formula R'OOC—A—COOR' wherein A is a valence bond or a divalent hydrocarbyl radical having from 1 to 8 carbon atoms and R' is an alkyl group containing 1 to 4 carbon atoms or a hydroxyalkyl group containing 2 to 4 carbon atoms, wherein the two R' radicals may be the same or different; and (C) at least one zinc dihydrocarbyldithiophosphinate in which the hydrocarbyl group is selected from acyclic alkyl radicals containing 4 to 10 carbon atoms and cycloaliphatic radicals containing from 4 to 10 carbon atoms; wherein the amount of antistatic agent is sufficient to improve the antistatic characteristics of said polyamide and the amount of zinc dihydrocarbyldithiophosphinate is such that when said polyamide composition is dyed the K/S value will be greater than that which would be observed if the zinc dihydrocarbyldithiophosphinate were not present in said polyamide composition.

13. A polyamide composition according to claim 12 wherein said zinc dihydrocarbyldithiophosphinate is added to a melt of said antistatic agent and the resulting composition is compounded with the polyamide.

14. A composition according to claim 12 wherein said zinc dihydrocarbyldithiophosphinate is zinc dicyclohexyldithiophosphinate.

15. A polyamide composition prepared by admixing (A) a polyamide, (B) an antistatic agent comprising the reaction product of (1) at least one tetrol compound of the formula:

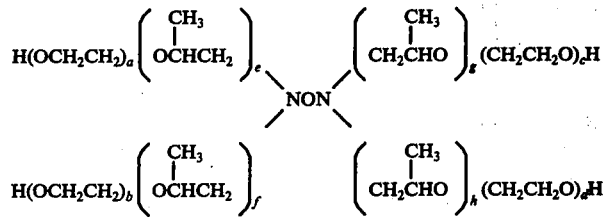

where $a, b, c, d, e, f, g,$ and $h$ are each a whole number and the total of $a, b, c,$ and $d$ is between 8 and 1,000 and the total of $e, f, g,$ and $h$ is between 8 and 850, Q is an alkylene radical containing 1 to 13 carbon atoms, wherein the molecular weight of said tetrol compound is between about 1,650 and about 135,000 and said (OCH$_2$CH$_2$) moieties make up from about 10 to about 90 weight percent of said tetrol compound, and (2) at least one dicarboxylic acid ester having the formula R'OOC—A—COOR' wherein A is a valence bond or a divalent hydrocarbyl radical having from 1 to 8 carbon atoms and R' is an alkyl group containing 1 to 4 carbon atoms or a hydroxyalkyl group containing 2 to 4 carbon atoms, wherein the two R' radicals may be the same or different; and (C) zinc dicyclohexyldithiophosphinate; wherein the amount of said antistatic agent is in the range of about 1 to about 12 weight percent, based on the weight of the polyamide, and the amount of zinc dicyclohexyldithiophosphinate is in the range of about 0.02 to about 2.5 weight percent, based on the weight of the polyamide plus the antistatic agent.

16. A composition according to claim 15 wherein the zinc dicyclohexyldithiophosphinate is added to a melt of said antistatic agent and the resulting composition is compounded with the polyamide.

17. A composition according to claim 16 wherein the antistatic agent is one which can be prepared by reacting dimethyl terephthalate with a tetrol compound having an ethylene oxide moiety content of about 60 weight percent and a molecular weight of about 20,000.

18. A composition according to claim 17 wherein said polyamide is poly(hexamethylene adipamide).

19. A composition according to claim 18 which has been dyed with an acid dye selected from Merpacyl Blue 2GA, Merpacyl Blue SW, and Lanasyn Brilliant Red RL.

20. A composition according to claim 19 which has been spun into filaments prior to being dyed.

21. A composition according to claim 18 wherein said polyamide composition also contains tetrakis[methylene(3,5-di-t-butyl-4-hydroxyhydrocinnamate)] methane in an amount in the range of from about 0.02 to about 2 weight percent based on the weight of polyamide plus antistatic agent.

22. A composition according to claim 16 wherein said polyamide composition also contains tetrakis[methylene(3,5-di-t-butyl-4-hydroxyhydrocinnamate)] methane in an amount in the range of from about 0.02 to about 2 weight percent based on the weight of polyamide plus antistatic agent.

23. A composition according to claim 16 wherein said polyamide composition also contains a hindered phenol selected from the group consisting of 2,6-di-t-butyl-4-methylphenol, octadecyl[3-(3,5-di-t-butyl-4-hydroxyphenyl)] propionate, di-n-octadecyl(3,5-di-t-butyl-4-hydroxybenzyl) phosphonate, tetrakis[methylene(3,5-di-t-butyl-4-hydroxyhydrocinnamate)] methane, *1,3,5-*trimethyl-2,4,6-tris (3,5-di-t-butyl-4-hydroxybenzyl)]benzene and tris (3,5-di-t-butyl-4-hydroxybenzyl)benzene and tris 3,5-di-t-butyl-4-hydroxybenzyl)isocyanurate, in an amount of about 0.02 to about 2 weight percent based on the weight of polymide plus antistatic agent.

* * * * *

UNITED STATES PATENT AND TRADEMARK OFFICE
CERTIFICATE OF CORRECTION

PATENT NO. : 4,069,277

DATED : January 17, 1978

INVENTOR(S) : Ronald D. Mathis; James S. Dix

It is certified that error appears in the above-identified patent and that said Letters Patent are hereby corrected as shown below:

Column 10, line 22, delete "1" and insert --- 11 ---.

Column 11, line 32, in the center area of the formula, delete "NON" and insert --- NQN ---.

Column 12, line 13, in the center area of the formula, delete "NON" and insert --- NQN ---.

Signed and Sealed this

Eighth Day of August 1978

[SEAL]

Attest:

RUTH C. MASON
*Attesting Officer*

DONALD W. BANNER
*Commissioner of Patents and Trademarks*